US008643708B1

(12) United States Patent
Chang et al.

(10) Patent No.: US 8,643,708 B1
(45) Date of Patent: *Feb. 4, 2014

(54) MULTI-FUNCTION IMAGE AND VIDEO CAPTURE DEVICE FOR USE IN AN ENDOSCOPIC CAMERA SYSTEM

(75) Inventors: William H. L. Chang, Milpitas, CA (US); Salmaan Hameed, San Jose, CA (US); Amit A. Mahadik, Santa Clara, CA (US); Kiran A. Javadekar, Santa Clara, CA (US); Oretho F. Abello, Tracy, CA (US)

(73) Assignee: Stryker Corporation, Kalamazoo, MI (US)

( * ) Notice: Subject to any disclaimer, the term of this patent is extended or adjusted under 35 U.S.C. 154(b) by 2092 days.

This patent is subject to a terminal disclaimer.

(21) Appl. No.: 10/873,865

(22) Filed: Jun. 21, 2004

Related U.S. Application Data

(63) Continuation of application No. 09/439,632, filed on Nov. 11, 1999, now Pat. No. 6,791,601.

(51) Int. Cl.
*A62B 1/04* (2006.01)

(52) U.S. Cl.
USPC .......................................................... 348/65

(58) Field of Classification Search
USPC ............ 348/65, 74, 620, 42, 47, 98; 345/419; 600/437; 707/104.1
IPC ....................................................... A62B 1/04
See application file for complete search history.

(56) References Cited

U.S. PATENT DOCUMENTS

| 5,408,465 | A | | 4/1995 | Gusella et al. | |
|---|---|---|---|---|---|
| 5,627,584 | A | * | 5/1997 | Nishikori et al. | ............... 348/72 |
| 5,675,584 | A | * | 10/1997 | Jeong | ............................ 370/284 |
| 5,740,801 | A | * | 4/1998 | Branson | ........................ 600/407 |
| 5,877,819 | A | | 3/1999 | Branson | |
| 5,902,230 | A | * | 5/1999 | Takahashi et al. | ............ 600/109 |
| 5,993,001 | A | * | 11/1999 | Bursell et al. | ................. 351/212 |
| 6,074,213 | A | * | 6/2000 | Hon | .............................. 434/262 |
| 6,272,235 | B1 | * | 8/2001 | Bacus et al. | ................... 382/133 |
| 6,272,470 | B1 | * | 8/2001 | Teshima | ............................ 705/3 |

(Continued)

FOREIGN PATENT DOCUMENTS

JP 07141498 * 6/1995

OTHER PUBLICATIONS

Federal Standard 1037C: Glossary of Telecommunications Terms, Multicast, http://www.its.bldrdoc.gov/fs-1037/fs-1037c.htm, dated Aug. 7, 1996, downloaded on Mar. 23, 2009, 2 pages.

*Primary Examiner* — Tung Vo
(74) *Attorney, Agent, or Firm* — Blakely Sokoloff Taylor & Zafman LLP (57) ABSTRACT

An image capture unit for use in a medical imaging system can be coupled to an endoscopic camera, an external monitor, and a network. The image capture unit includes a touchscreen display to generate a graphical user interface and to receive associated user inputs. The image capture unit receives live video generated by the endoscopic camera, displays the video on the external monitor and/or the display, and stores the live video. The image capture unit can also store the live video in a remote computer system via the network. The image capture unit further can capture and store still images based on the live video and can store the still images in the remote computer system. "One-touch" network login and storage allows these operations to be performed in response to a single touch by the user.

14 Claims, 12 Drawing Sheets

(56) References Cited

U.S. PATENT DOCUMENTS

| | | |
|---|---|---|
| 6,369,812 B1 * | 4/2002 | Iyriboz et al. .................. 345/419 |
| 6,377,162 B1 * | 4/2002 | Delestienne et al. .... 340/286.07 |
| 6,424,996 B1 * | 7/2002 | Killcommons et al. ...... 709/206 |
| 6,425,865 B1 | 7/2002 | Salcudean et al. |
| 6,432,046 B1 * | 8/2002 | Yarush et al. ................. 600/179 |
| 6,611,846 B1 | 8/2003 | Stoodley |
| 7,028,182 B1 * | 4/2006 | Killcommons ............... 713/161 |

* cited by examiner

MULTI-FUNCTION IMAGE AND VIDEO CAPTURE DEVICE FOR USE IN AN ENDOSCOPIC CAMERA SYSTEM

This application is a continuation of U.S. patent application Ser. No. 09/439,632 of Chang et al., filed on Nov. 11, 1999, which is incorporated herein by reference, which has issued as U.S. Pat. No. 6,791,601.

FIELD OF THE INVENTION

The present invention pertains to image processing in an endoscopic camera system. More particularly, the present invention relates to techniques for capturing, recording, manipulating, and maintaining images acquired by an endoscopic camera.

BACKGROUND OF THE INVENTION

Endoscopy is a medical field in which internal features of the body of a patient are viewed without the use of traditional, fully-invasive surgery. Endoscopy is now widely used to perform minimally-invasive surgical procedures, such as arthroscopy and laparoscopy. A basic endoscopy tool is the endoscopic camera system. An endoscopic camera system generally includes a scope that is inserted into the body of a patient and a camera that is optically and physically coupled to the scope. Images acquired by the camera are typically displayed on a conventional video monitor.

A high intensity light source is normally coupled to the scope by a fiber optic cable to introduce light into the body. The camera is normally coupled through a flexible transmission line to a camera control unit, which is often mounted on a mobile cart. The camera control unit processes video data provided by the camera head to generate images, which are displayed on a video monitor. The control unit may also be coupled to various peripheral devices, such as a printer and a blue video cassette recorder (VCR).

Figure 1A:
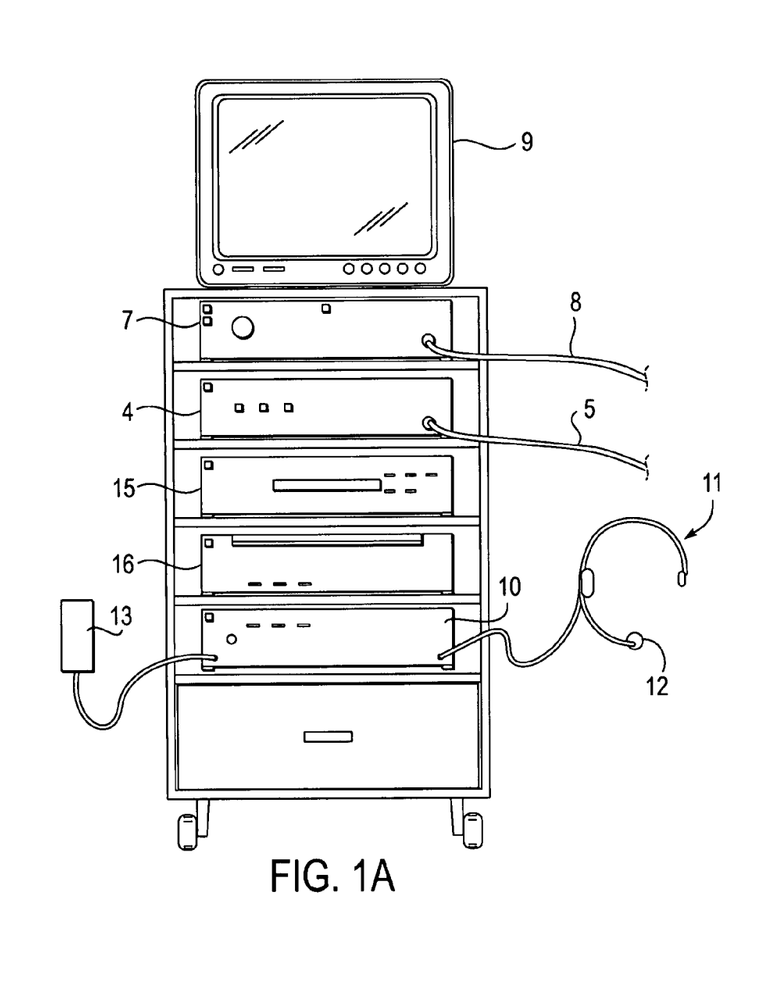
FIGS. 1A and 1B collectively illustrate a conventional endoscopic camera system.
Figure 1B:
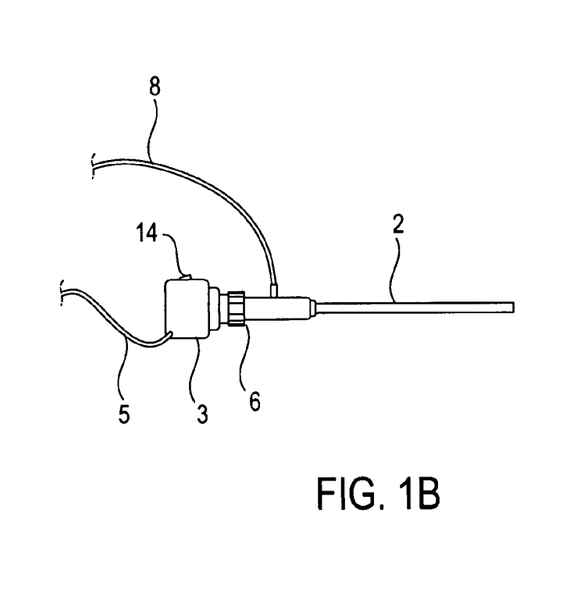

FIGS. 1A and 1B collectively illustrate a conventional endoscopic camera system. The illustrated camera system includes a rigid scope 2 of the type that is commonly used for laparoscopy or arthroscopy. The scope 2 is coupled to a camera 3 by a coupler 6. The camera 3 includes well-known circuitry, such as charge-coupled devices (CCDs), for acquiring color video data of internal features of the body through a system of lenses within the scope 2. Light is provided to the scope 2 by flexible light source 7 through fiber optic cable 8. The camera 3 is coupled to camera control unit (CCU) 4 by a flexible transmission line 5. Operation of the camera system is controlled, in part, from CCU 4. Transmission line 5 conveys video data from the camera 3 to the CCU 4 and conveys various control signals bi-directionally between the camera 3 and the CCU 4. It is assumed, for purposes of this description, that image data output by the camera 3 onto transmission line 5 are in an analog format, such as National Television Standards Committee (NTSC) format or Phase Alternating Line (PAL) format.

One or more buttons 14 or other similar manual controls on the camera 3 allows a user to control certain functions of the camera system. Certain functions may also be controlled by voice commands using a voice response control system (VCS) 10, which is coupled to the CCU 4. Voice commands are input into a microphone 12 on a headset 11 worn by the surgeon and coupled to the voice control response system (VCS) 10. VCS 10 employs speech-recognition techniques to generate control signals in response to the voice commands. A handheld control device (pendant) 13 is coupled to the VCS 10 as an alternative means of operating certain functions of the VCS 10. Also coupled to the CCU 4 are a video cassette recorder (VCR) 15, a printer 16, and perhaps other devices (not shown), as desired. Video data acquired by camera 3 and processed by CCU 4 is converted to images, which can be displayed on monitor 9, recorded in VCR 15, and/or used to generate static images. Hard copies of still images can be produced by printer 16.

The image processing capabilities of this and other conventional endoscopic camera systems have certain shortcomings. In particular, these systems do not facilitate the easy storage, access, manipulation, and distribution of video and still images acquired by the camera. For example, the conventional technique of recording endoscopic surgery on videotape is not conducive to quickly and easily locating and playing back a particular clip of video in the middle of a recording. In addition, while the system normally allows still images to be captured and printed out, there may be no way to review captured still images during endoscopic surgery without interrupting the live video display. Further, it is difficult or impossible to edit or enhance acquired video without the use of additional equipment and facilities. In addition, it may be desirable to archive recorded video or still images of endoscopic surgery at more than one location, which conventional systems provide no convenient and easy way of doing. Further, it may be desirable to share video acquired during endoscopic surgery with multiple viewers at various remote locations, which also can be difficult or impossible with conventional systems.

SUMMARY OF THE INVENTION

The present invention includes an image capture unit for use in an endoscopy system. In certain embodiments, the image capture unit comprises a capture circuit operable to receive and capture video generated by an endoscopic camera and to capture still images from the video; a storage device to store the captured video and still images, a network interface to connect the image capture unit to a network; and a processing unit. In various embodiments, the processing unit is operable to cause any of various operations, such as to cause the captured video to be transmitted to and stored on one or more remote processing systems over the network, which may be in response to a single user input.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A multi-function digital image capture device for use with an endoscopic camera system is described. As will be described in greater detail below, the device includes a touch-screen display, through which a user-friendly, touch-controlled, graphical user interface is provided. The image capture device is configured to receive input from an endoscopic camera and to provide output to an external monitor and a network. The device receives live video generated by the endoscopic camera, displays the video on the external monitor and the LCD display, and records the live video on an internal mass storage device. During video acquisition and prior to recording, the video is buffered in another, faster-responding mass storage device and is compressed. The image capture device can also store the live video on a remote computer system via the network. A "one-touch" network login and storage function allows this function to be performed in response to a single touch input by the user. The device can also capture and store still images based on the live video, either internally or on a remote computer system. Live or recorded video or still images can also be multicast to multiple remote devices on the network. In the event of a loss of power to the image capture device, video from the camera is automatically routed directly to the external monitor, such that there is no appreciable interruption in the live video display. The features of the graphical user interface include handwriting recognition capability implemented in conjunction with the touch-screen display, and the display of thumbnail versions of all captured still images, from which the user can select to display any image at full-size. A tabbed album display mode provides convenient organization of, and access to, stored images. "On-demand" printing allows hard copies of captured images to be printed automatically after each time a certain number of images has been captured.

Figure 2:
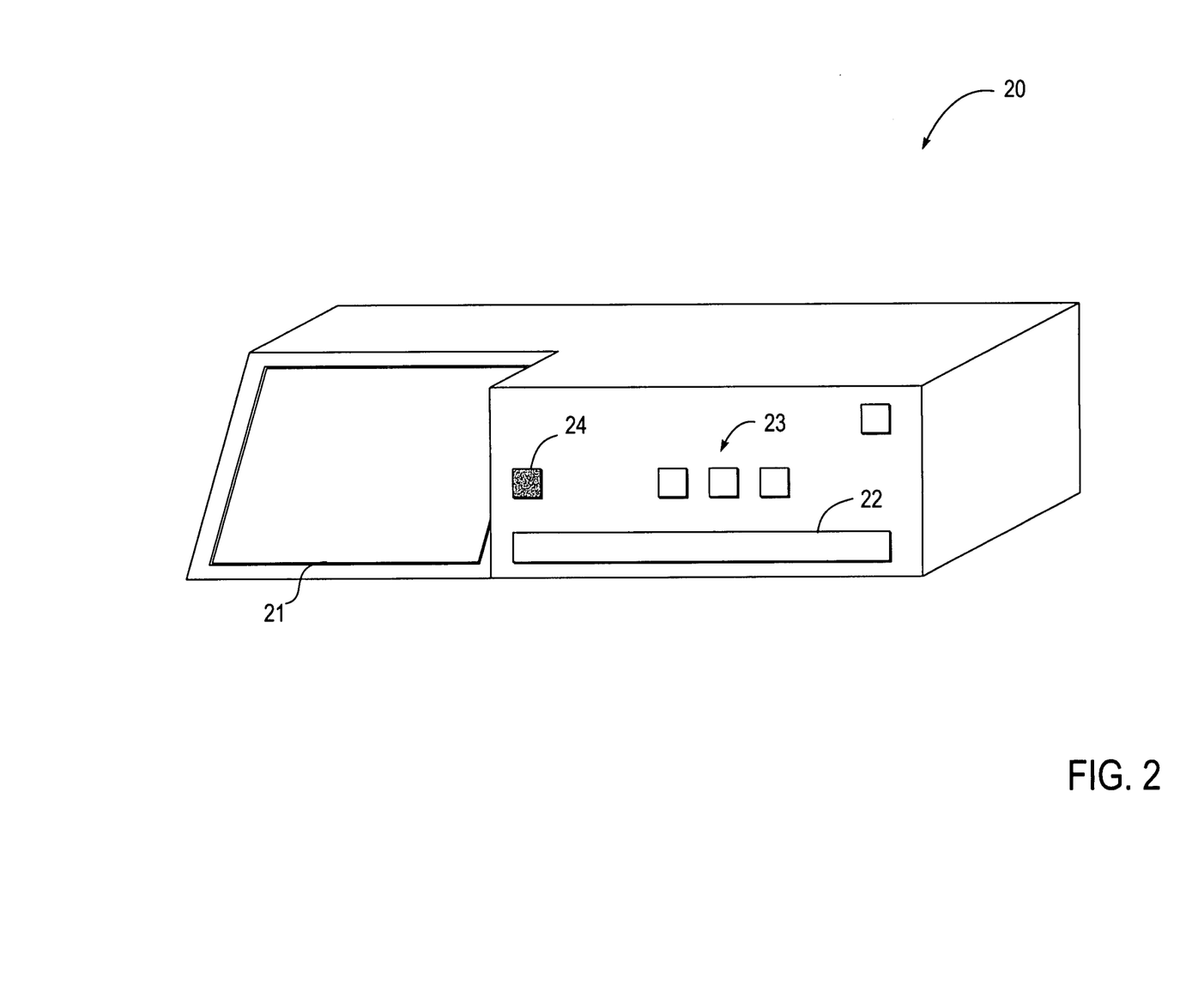
FIG. 2 illustrates an external view of the Digital Capture System (DCS)

FIG. 2 illustrates an external view of the image capture device, hereinafter referred to as the Digital Capture System (DCS), according to a least one embodiment. The DCS 20 is sized to fit conveniently in a shelf or compartment of a standard mobile endoscopy cart, such as the one shown in FIG. 1A. The DCS 20 is a self-contained unit which includes its own liquid crystal display (LCD) 21, in addition to having a connection port (not shown) to an external monitor, such as monitor 9 in FIG. 1A. The LCD 21 is a touch-sensitive ("touch-screen") device capable of receiving user inputs. In the embodiments shown, the LCD 21 is angled upward, to facilitate easy viewing entry of user inputs from a standing position, when the DCS is located on a cart. The DCS 20 includes an internal drive bay 22 that houses an internal optical mass storage device, which is used to store recorded video and still images. In at least one embodiment, and as is henceforth assumed in this description, the aforementioned mass storage device is a Recordable Compact Disk (CD-R) drive and storage medium. In other embodiments, however, the mass storage device may be another type of mass storage device, such as a Digital Versatile Disk (DVD) based storage device, or any other non-volatile storage device suitable for storing video and still images. The DCS 20 also includes an infrared (IR) port 24, which may be used to receive user inputs from an IR based remote control device. Note, however, that the DCS 20 can be controlled entirely from user inputs applied to the touch-screen display 21. Also, note that other types of ports can substitute for the IR port 24, such as a radio frequency (RF) port, a wired physical connection, etc. The DCS 20 may optionally include other controls or status indicators 23, as desired.

Figure 3:
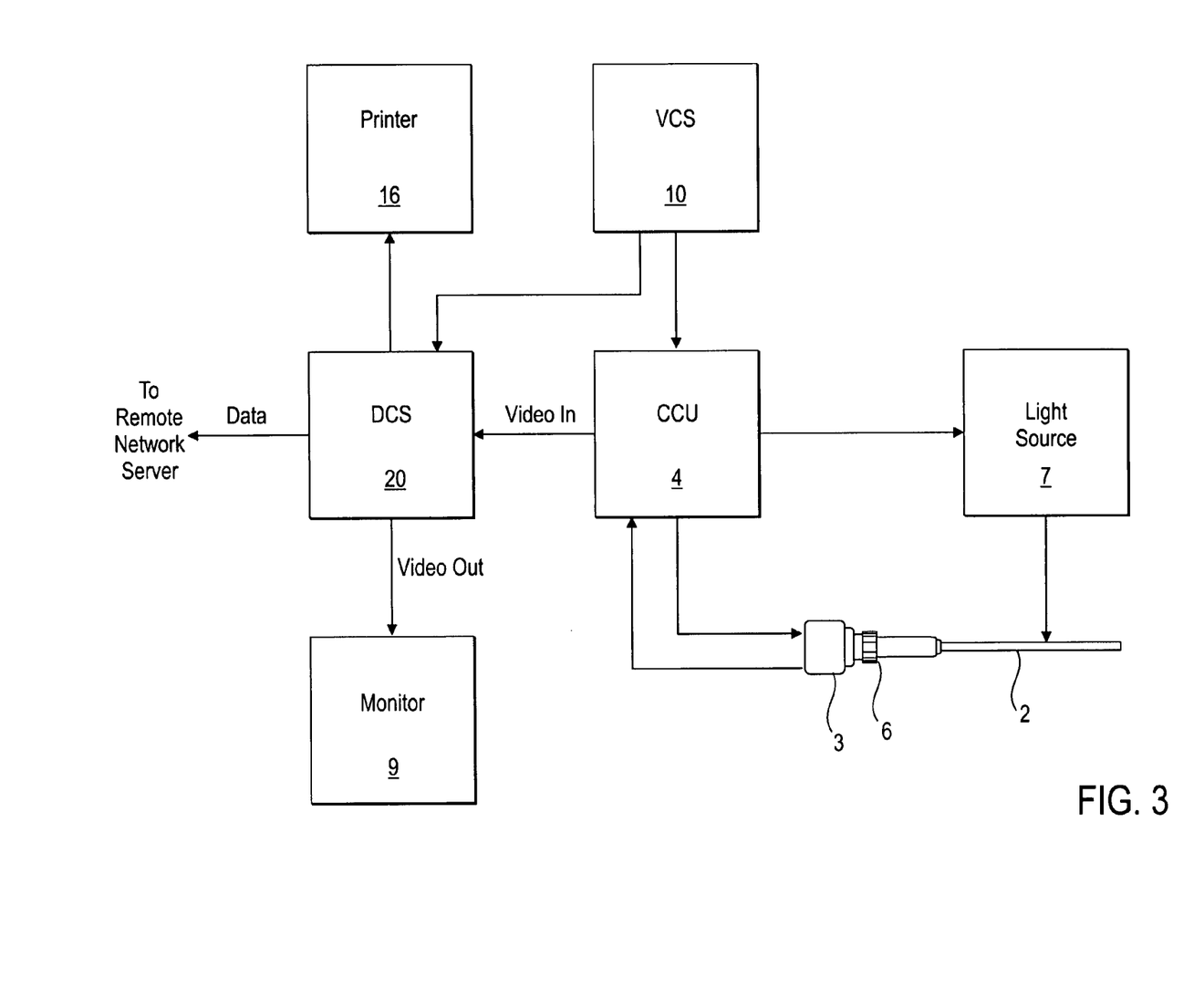
FIG. 3 is a block diagram of an endoscopic camera system that incorporates the DCS.

FIG. 3 is a block diagram of an endoscopic camera system that incorporates the DCS 20, according to a least one embodiment. As shown, the DCS 20 receives from the CCU 4 an input signal Video In carrying live video generated by the endoscopic camera 3. The DCS 20 optionally receives an input from the VCS 10, for allowing the DCS 20 to operate in response to voice commands. The DCS 20 outputs a video signal Video Out to the monitor 9. The Video In and Video Out signals may be, for example, either S-video or composite video (or any other type of video). In at least one embodiment, the DCS 20 includes a separate Video In input and a corresponding separate Video Out output for each such video type. The DCS 20 optionally has a network connection, onto which the DCS 20 outputs a Data signal, for transmitting video or still image data to one or more remote computer systems on the network. The DCS 20 further provides an output to the printer 16 for printing hard copies of still images.

Figure 4:
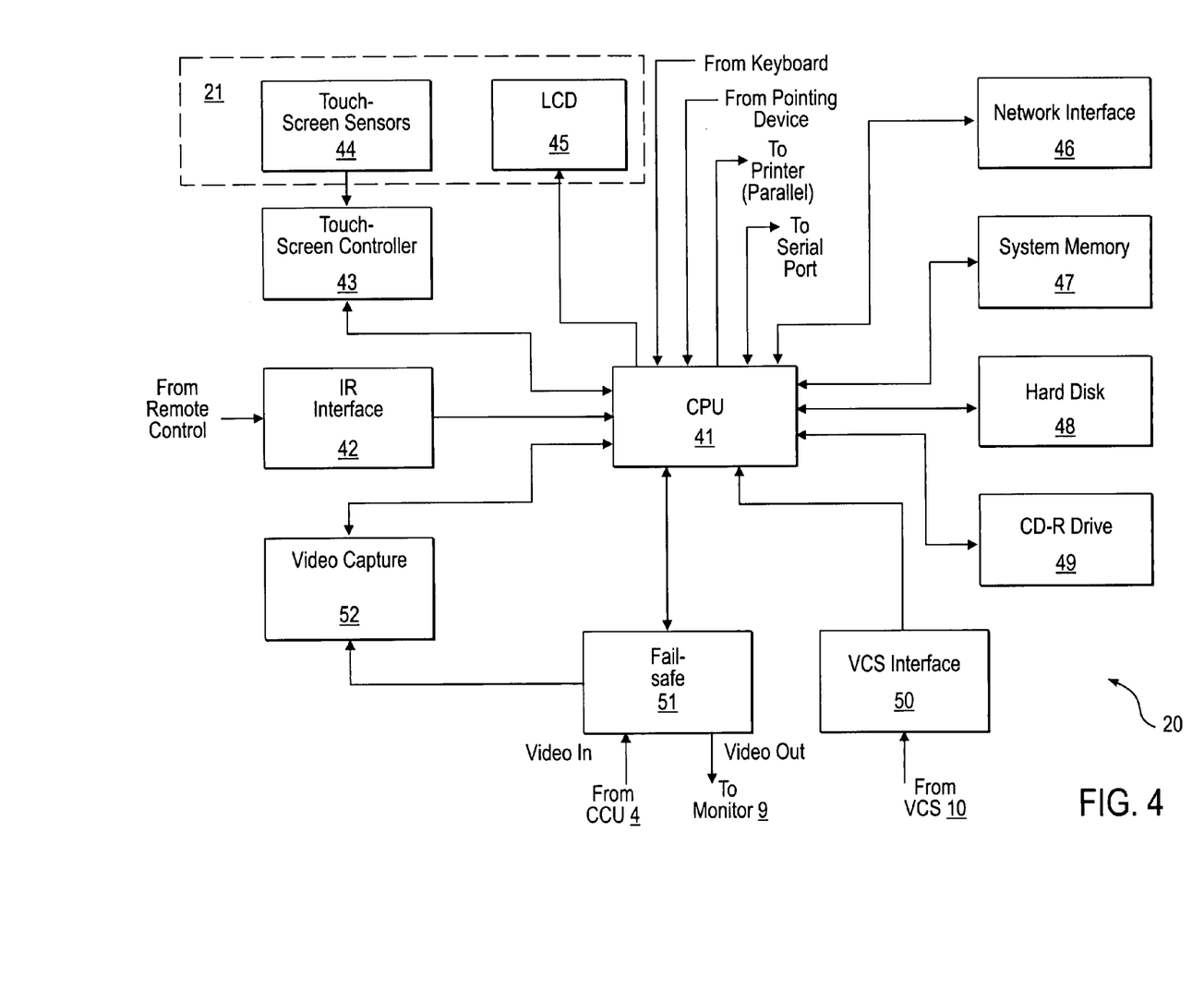
FIG. 4 is a block diagram showing the internal components of the DCS.

FIG. 4 is a block diagram showing the internal components of the DCS, according to at least one embodiment. As shown, the DCS 20 includes, and is controlled by, a central processing unit (CPU) 41. Also included in the DCS 20 and coupled to the CPU 41 are: an IR interface 42, a touch-screen controller 43, touch-screen sensors 44, an LCD display component 45, a network interface 46, system memory 47, a hard disk 48, a CD-R drive 49, a VCS interface 50, a fail-safe mechanism 51, and video capture circuitry 52. The CPU 41 may optionally receive user inputs from a keyboard and/or a pointing device, such as a mouse, trackball, touchpad, or the like. The DCS 20 has a parallel port for connection to the printer 16 and optionally includes a serial port for connecting the DCS 20 to additional peripheral devices (which may include a printer, another mass storage device, etc.) on a high-speed serial link; such serial link may be, for example, a Universal Serial Bus (USB), an IEEE 1394 ("Firewire") bus, or the like. All of these components may be coupled to the CPU 41 through one or more internal buses, such as a Peripheral Component Interconnect (PCI) bus or the like.

The IR interface 42 receives an IR signal from a remote control device, for allowing remote user control of the DCS 20. The touch-screen sensors 44 and the LCD display component 45 are both elements of the LCD touch-screen display 21 shown in FIG. 2. The touch-screen controller 43 is used to coordinate transmission of user inputs received at the touch-screen sensors 44 to the CPU 41. The network interface 46 provides the DCS 20 with a connection to a network, which may be a local area network (LAN), a wide area network (WAN), the Internet, or any other type of network. Hence, the network interface 46 may be, for example, an Ethernet adapter, a conventional modem, an Integrated Services Digital Network (ISDN) adapter, a Digital Subscriber Line (xDSL) adapter, a cable modem, a satellite modem, etc. System memory 47 is used primarily for storage of software instructions and related data, but also may be used for temporary storage of video or still images. Accordingly, system memory 47 may include volatile memory, non-volatile memory, or both. Such volatile memory may be, for example, any type of random access memory (RAM). Any such non-volatile memory may be of for example, any type of read only memory (ROM), such as EPROM or flash memory, etc. The VCS interface 50 provides an interface to the VCS 10 (see FIG. 3).

As noted, the DCS 20 also includes a hard disk 48 and a CD-R drive 49. The CD-R drive 49 is used to provide non-volatile storage of recorded video from the endoscopic camera 3 as well as still images captured from such video. Thus, CD-R drive 49 is the mass storage device referred to above and connection with FIG. 2. As noted, however, other types of mass storage devices may be substituted for the CD-R drive 49, as long as such device is suitable for storing video data in sufficient quantities to be useful for endoscopic surgery.

Recorded video is stored using a suitable compression format. In at least one embodiment, this format is Motion Picture Experts Group (MPEG) 1 encoding. Other types of compression/encoding may alternatively be used, however, such as MPEG-2 or wavelet based compression.

With current data storage technology, the process of writing to a recordable (writeable) CD can be time-consuming. Hence, it is not desirable to have to record images to the CD-R during endoscopic surgery, as doing so may interfere with or slow down other functions of the DSC 20. Therefore, hard disk 48, which is a non-volatile mass storage device that has a faster write-response time than that of the CD-R drive 49, is used to buffer the live video and captured still images, prior to writing such images to the CD-R drive 49. The hard disk 48 may be, for example, a conventional hard (magnetic) disk drive. Hence, video and still images may be captured onto the hard disk 48 as they are acquired during endoscopic surgery, and then recorded onto the CD-R drive 49 after the surgery is complete. The process of transferring the data from the hard disk 48 onto the CD-R drive 49 may be performed either manually (i.e., in response to a user input) or automatically (e.g., in response to a predetermined condition being detected, such as the video input Video In from the CCU 4 being disconnected).

The video capture circuitry 52 captures video received from the endoscopic camera 3 (via the CCU 4) and still images based on such video. The video capture circuitry 52 also performs the above-mentioned encoding/compression of video that is to be recorded. The video capture circuitry 52 may be a standard "off-the-shelf" video capture board. One example of such an off-the-shelf part which may be suitable is the RT6 capture board from Vitec Multimedia of Sunnyvale, Calif. Depending on which board is used, it may be desirable to perform certain modifications to the video capture circuitry 52 and/or the associated driver software, to customize the video capture functions for the endoscopy environment. For example, certain off-the-shelf video capture boards may cause undesirably high CPU utilization, which may slow down system response time. This may, in turn, slow down image capture time. An example of an optimization that may be desirable in such cases is to reduce the number and/or frequency of calls in the driver software to the rendering function, to eliminate unnecessary instances of such calls. That is, it may not be necessary or desirable to constantly render incoming live video, and doing so tends to greatly increase CPU utilization. Other types of optimizations may be performed as desired, depending on the desired trade-off between performance, complexity, cost, etc.

The fail-safe mechanism 51 ensures that there is no appreciable interruption in the display of live video on the external monitor 9 in the event of inadvertent loss of power to the DCS 20 or, if desired, any other specified fault condition. The fail-safe mechanism 51 receives the Video In signal from the CCU 4 and outputs the Video Out signal to the external monitor 9. As noted above, the Video In and Video Out signals may be either S-video or composite video (or any other video format), and separate connections may be provided for each such video type. During normal operation, video received from the camera 3 on the Video In signal is routed to the CPU 41 via the video capture circuitry 52, prior to being provided to the external monitor 9. However, in the event of a loss of power to the DCS 20, the fail-safe mechanism 51 immediately and automatically switches the routing of the Video In signal, such that the Video In is routed directly to the monitor 9. Although a slight interruption may occur in the video signal provided to the monitor 9, the interruption will be barely perceivable and will be sufficiently brief so as to cause no inconvenience to medical personnel or safety risk to the patient.

Figure 5:
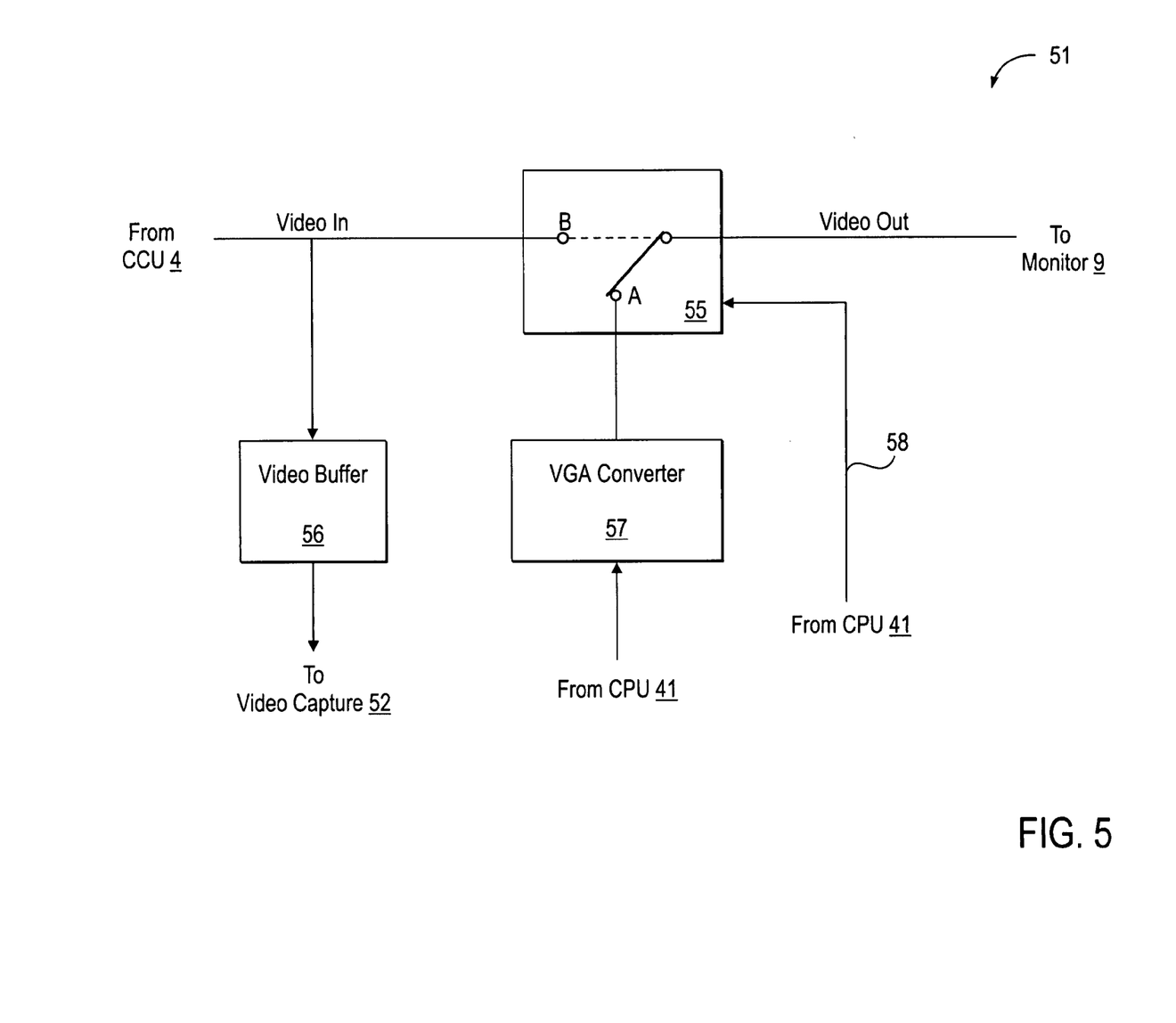
FIG. 5 is a block diagram showing the fail-safe mechanism of the DCS.

Refer now to FIG. 5, which is a block diagram of the fail-safe mechanism 51. In the illustrated embodiment, the fail-safe mechanism 51 includes a CPU-controlled switching mechanism 55, a video buffer 56, and a VGA converter 57. In at least one embodiment, the switching mechanism 55 is a conventional solid-state or electromechanical relay. The Video In signal carrying live video from the endoscopic camera 3 is input to the switching mechanism 55 and the video buffer 56. The switching mechanism 55 has two possible positions, position A or position B. During normal operation, the switching mechanism 55 is in position A. When power is applied to the DCS 20 and the DCS 20 is operating normally, the control signal 58 from the CPU 41 has a state which causes a switching mechanism 55 to remain in position A. In the event of a loss of power to the DCS 20 (or other specified fault condition), the state of the control signal 58 changes (or the control signal is lost), which causes the switching mechanism 55 to switch to position B.

Thus, during normal operation, the Video In signal is routed to the (analog) video buffer 56, which provides the buffered video to the video capture circuitry 52. The CPU 41 outputs image data and other data in the form of a VGA signal, which is input to the VGA converter 57. The VGA converter 57 converts this VGA input into S-video or composite video format, as appropriate, and applies the converted signal to position A of the switching mechanism 55. The converted signal is then output as the Video Out signal to the monitor 9.

Figure 6:
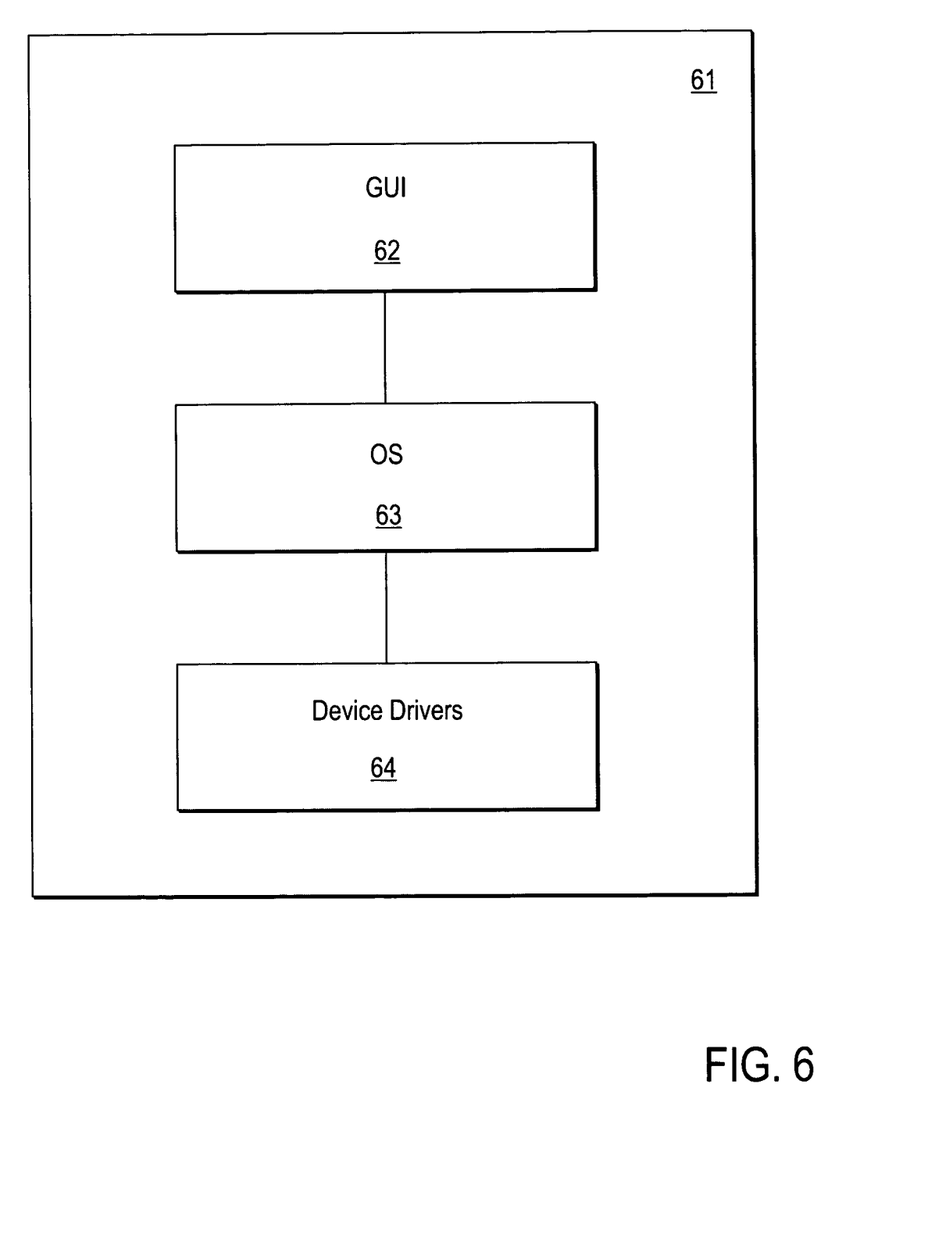
FIG. 6 is a block diagram of the software configuration of the DCS.

Some features of the DCS 20 may be implemented in software, at least in part. The software may be executed as appropriate by the CPU 41 or certain peripheral components, such as the video capture circuitry 52. FIG. 6 shows the overall software configuration of the DCS 20. As shown, the software 61 includes three major components: a Graphical User Interface (GUI) 62, an operating system (OS) 63, and a set of device drivers 64. The OS 63 may be a conventional OS, such as Microsoft Windows 98. The device drivers 64 form a level of software that interfaces the OS 63 to the hardware components (see FIG. 4) of the DSC 20, for controlling the hardware components. The GUI 62 provides the high-level functions that enable a user to control and operate the DSC 20. The software 61 of the DCS 20 may be stored at least partially in system memory 47 (FIG. 4). The software 61 may also be stored at least partially in hard disk 48, CD-R 49, an external storage device, or any combination of the aforementioned storage devices.

Figure 7:
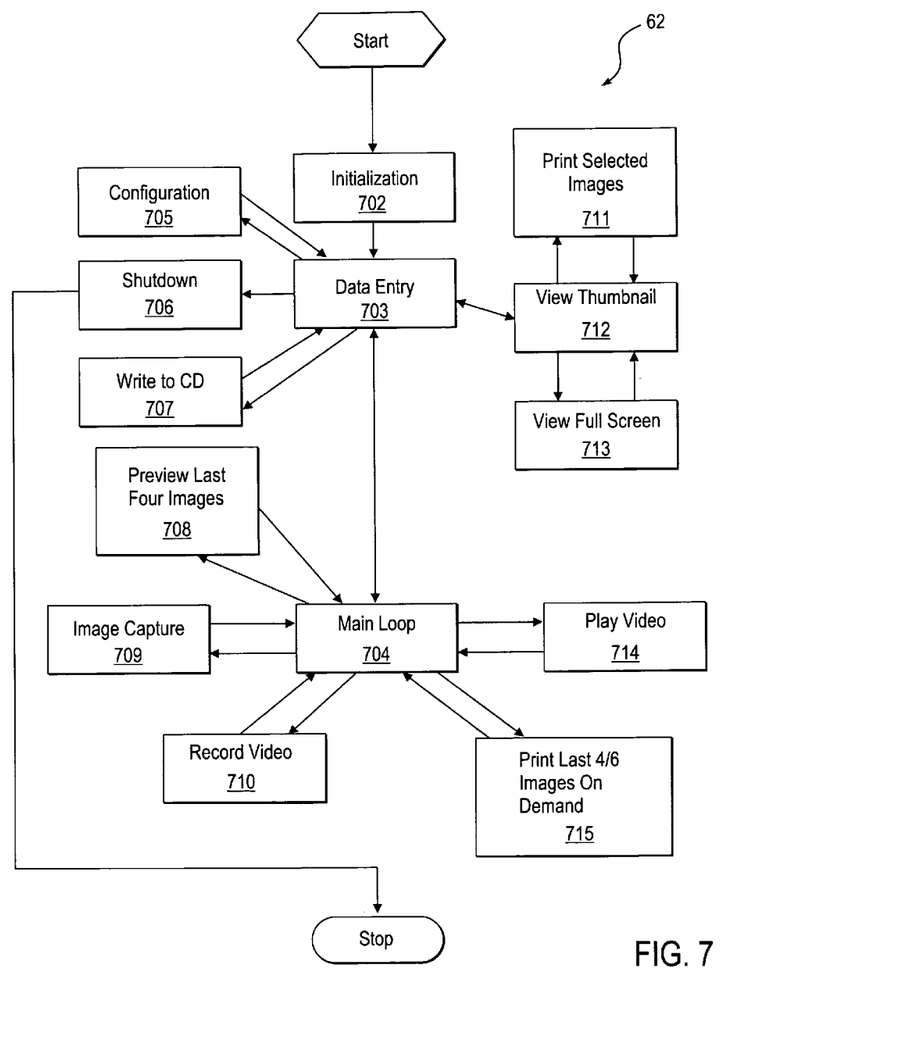
FIG. 7 is a flow diagram illustrating the overall operation of the Graphical User Interface (GUI) of the DCS.

FIG. 7 is a flow diagram illustrating the overall operation of the GUI 62. The GUI 62 includes a number of processes 702 through 715. Upon the initial application of power or a reset command, the GUI 62 enters the initialization process 702. The initialization process 702 includes a self test routine that tests all ports and storage media. The initialization process 702 also includes a check of whether data from the last operation was saved to the CD-R. If not, a user is prompted to either save the data to the CD-R or to delete the existing data, and appropriate action is taken based on the user's response. Various error conditions are checked for and handled, the details of which are not necessary for an understanding of the present invention.

Figure 8:
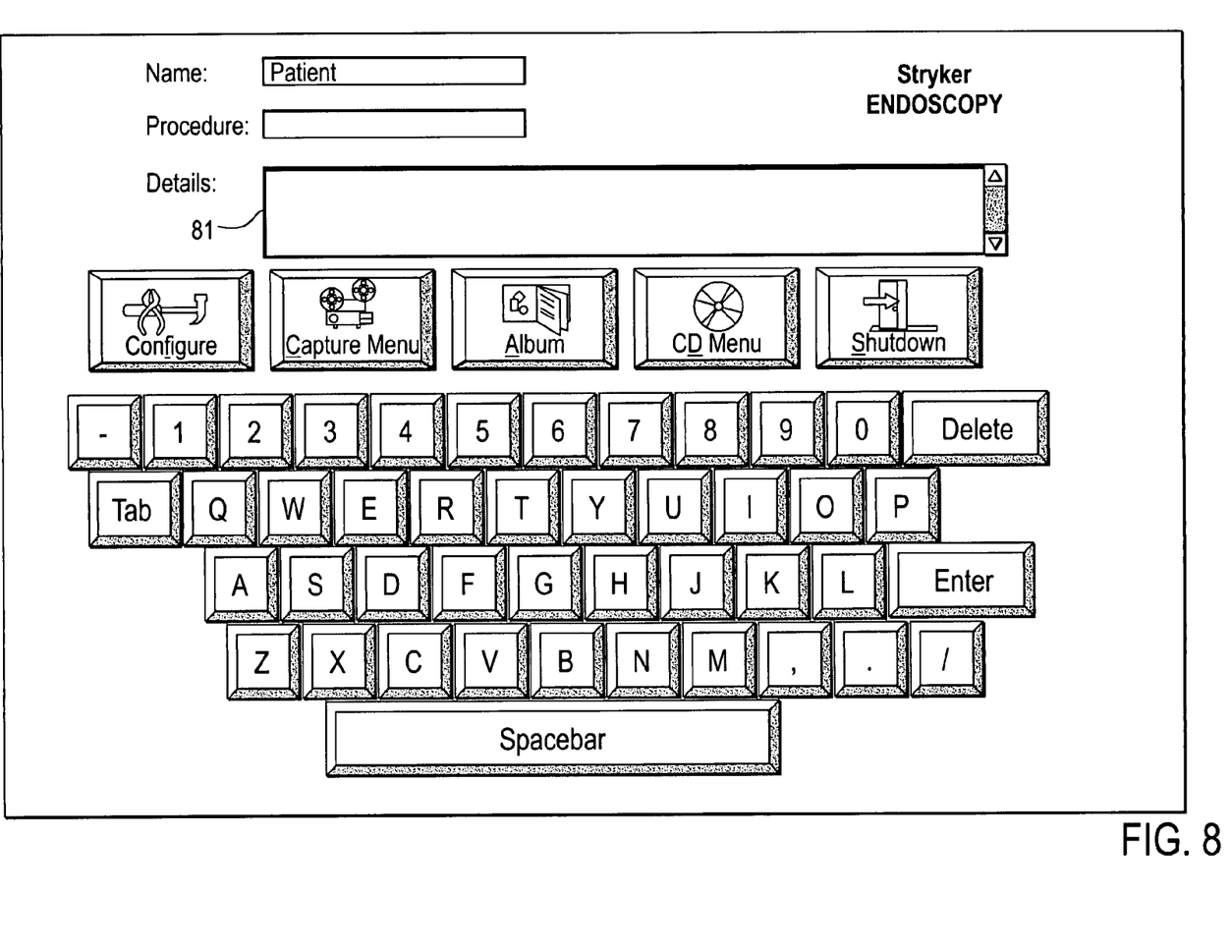
FIG. 8 shows a main menu screen generated by the GUI of the DCS.

Upon completion of the initialization process 702, the GUI 62 enters the data entry process 703. The data entry process 703 displays a main menu screen on the LCD 21. The main menu screen is characterized by a keyboard-like display, an example of which is shown in FIG. 8. From the main menu screen, the user can enter a patient name, procedure name, and procedure details for the current procedure, using touch-screen inputs. The keyboard display provides standard alphanumeric characters. The foregoing information can also be entered using an external keyboard such as mentioned above.

The GUI 62 includes a handwriting recognition engine, which allows a user to "write" in the "Details" box 81 using a stylus or other similar instrument, and such inputs are automatically recognized and converted to typed characters in the details box 81. The main menu screen also provides soft buttons to allow the user to access the configuration process 705, the image capture process 709, the view thumbnail (album) process 712, the write to CD process 707, or the shut-down process 706.

Figure 9:
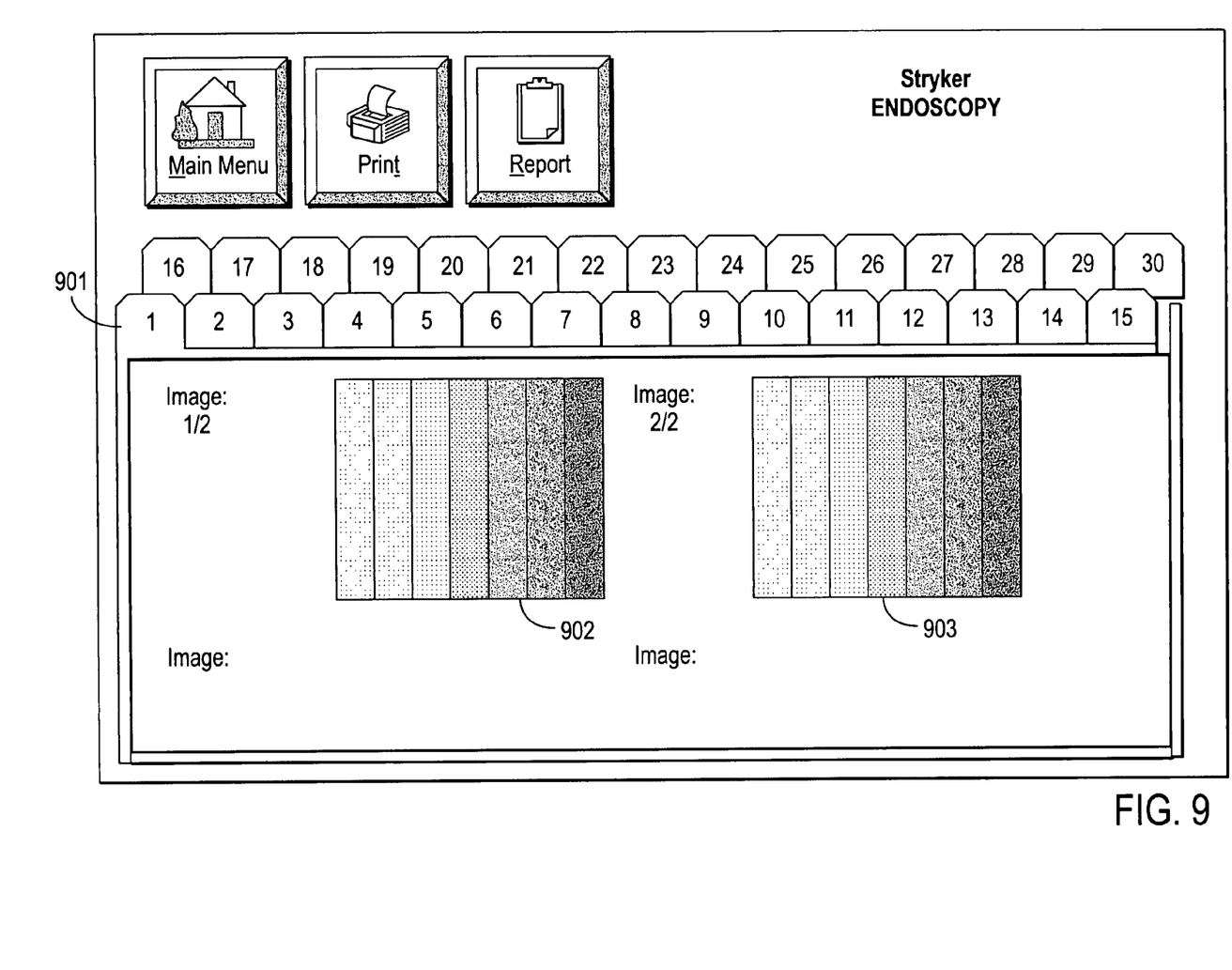
FIG. 9 shows an album display screen generated by the GUI of the DCS.
Figure 10:
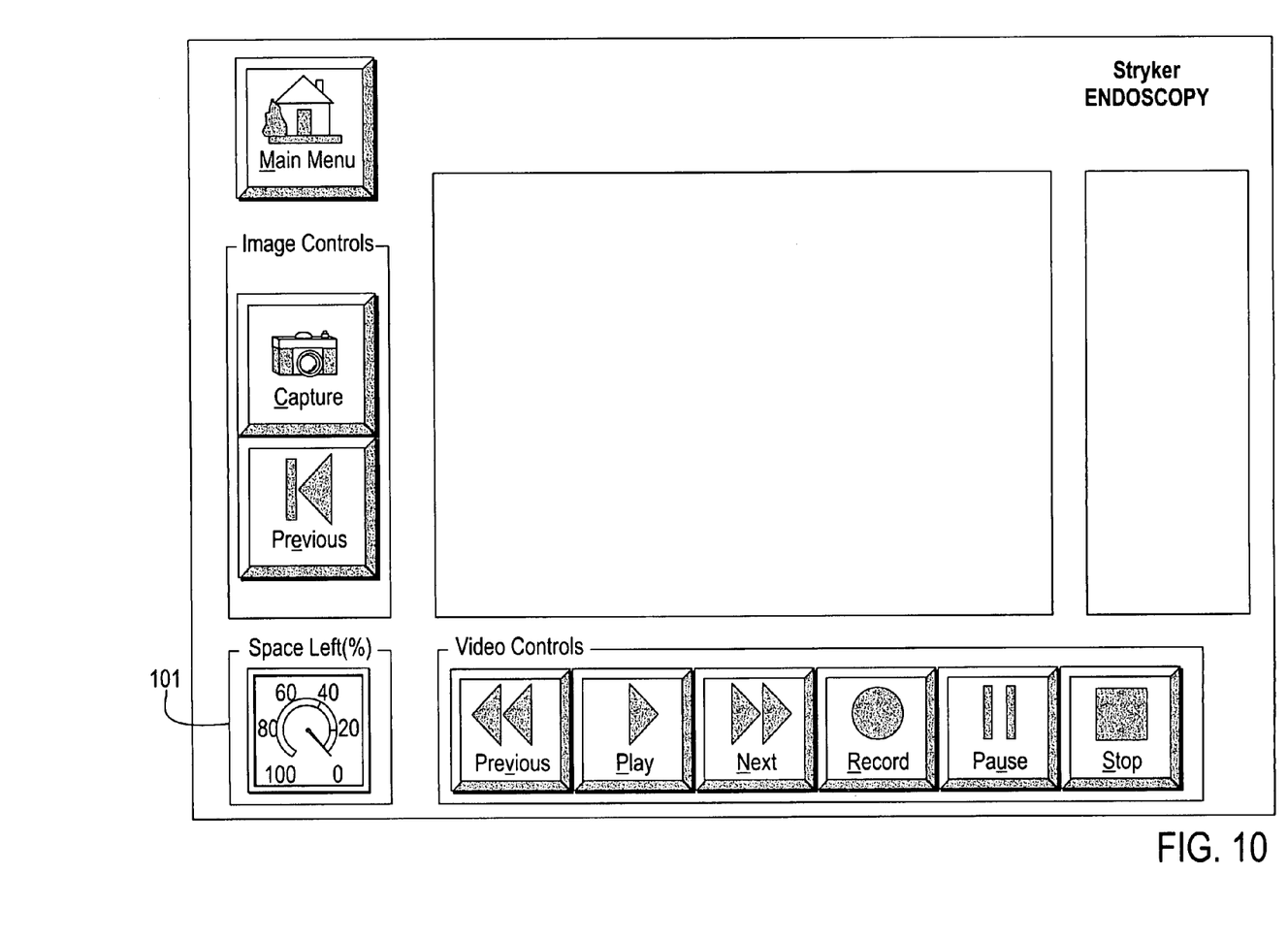
FIG. 10 shows a capture menu screen generated by the GUI of the DCS.

The view thumbnail process 712 generates what is referred to as the "album" display mode. The album display mode provides a display of thumbnail (reduced size) versions of all of the images captured in the current session, in a tabbed format, with several thumbnail images being displayable in each tabbed window. An example of the album display is shown in FIG. 9. The display includes a number of overlapping display windows, each of which can be activated by the user by touching its corresponding tab, such as tab 901. Thus, the user can navigate through the thumbnail images using touch-screen inputs. Each tabbed display window includes up to a predetermined number (e.g. four) of thumbnail images, such as images 902 and 903. The maximum number of thumbnail images per tabbed window is determined by the thumbnail image size setting, which may be determined as a user preference or a default. The tabbed windows can be reorganized, and the tabs can be labeled, so as to provide a convenient mechanism for organizing captured images. In the view thumbnail process 712, the user can view the full-sized image (process 713) of any thumbnail image by touching once on the displayed thumbnail image. In that case, the full-sized image is displayed on the monitor 9. The user can also print a selected image or images (processed 711) in the album display mode on the printer 16 using the "Print" soft button.

In the write to CD process 707, the GUI 62 allows the user to write all captured information to the CD-R. As noted above, this process is preferably done at the end of surgery, such that the data is written from the hard disk buffer 48. The user also has the option of saving the information to a remote server on the network, as discussed further below, or to any other (one or more) processing systems on the network.

In the preview last four images process 708, the user can view thumbnail images of the last four or six (or any other predetermined number of) captured still images.

The configuration process 705 allows the user to set various settings and parameters. For example, the configuration process 705 allows the user to: calibrate the touch-screen display 21; enter an address for a remote computer system on the network to which images will be saved; select and configured the printer 16 (which may also be a remote device on the network); determine the number of images to be printed per page; set the image size (which may affect printing speed); select various display parameters, such as brightness, contrast, hue and saturation; and, select the video source (e.g., S-video or composite).

Figure 11:
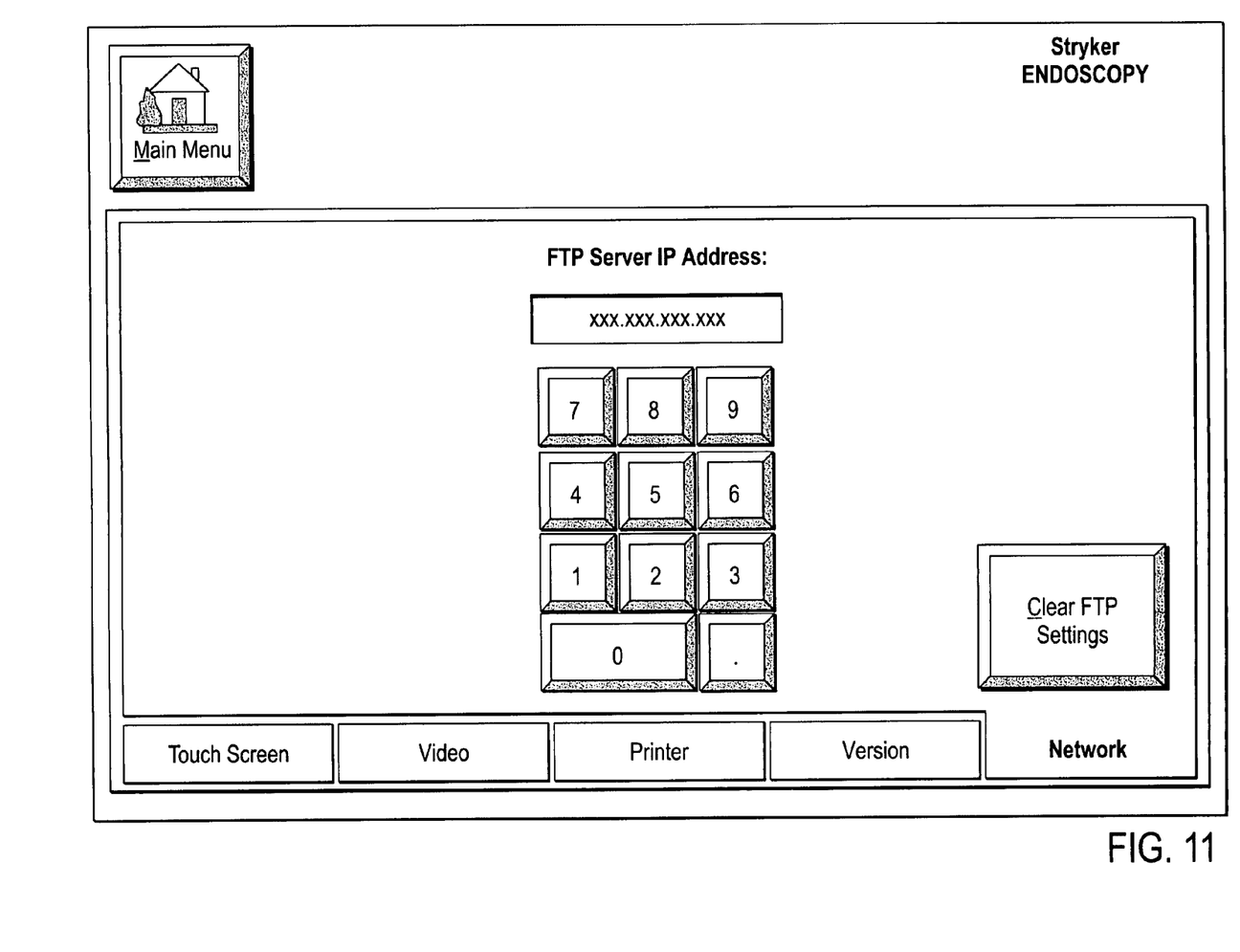
FIG. 11 shows a network setup screen generated by the GUI of the DCS.

The main loop 704 is the process in which the GUI 62 operates most of the time during normal operation. This is the process from which the user can access the processes for recording video (process 710), playing recorded video (process 714), capturing still images (process 709), or printing images "on demand" (process 715). As noted, video may be recorded using compression techniques such as MPEG-1, MPEG-2, wavelet compression, or any other suitable compression/encoding technique. The main loop 704 is characterized by a capture menu screen, an example of which is shown in FIG. 11. The capture menu screen provides soft button controls for each of these functions. When a still image is captured, the captured image is displayed on the LCD display 21 and is also briefly displayed (e.g., for about 0.5 seconds) on the external monitor 9. The captured image is temporarily saved on the hard disk 48. The capture menu includes a "Space Left" indicator 101, which graphically indicates the amount of available storage space remaining in the CD-R drive 49. This indication is generated by first computing the amount of free storage space in the CD-R drive 49, then subtracting from that value the amount of used storage space in the hard disk 48, and representing the difference as a percentage of the total CD-R storage space. A "Previous" soft button provides access to process 708 to view the thumbnail images of the last four (or any other predetermined number of) captured images.

The "on demand" printing process 715 allows images to be printed out automatically during endoscopic surgery, such that the user (e.g., the physician, nurse, or assistant) is not required to enter a print command for each image to be printed. That is, process 715 is configured to automatically print out the four or six (or any other predetermined number) most recently captured still images. This process repeats, such that a new page is automatically printed each additional time this preset number of images is captured. The images may be configured to print out on separate pages, or as multiple reduced size images on one page. The "on demand" printing process 715 can be disabled by the user, if desired.

The write to CD process 707 includes a sub-process which allows recorded video or captured still images to be transmitted to, and saved on, a remote server (or client or peer) via the network. In addition, the DCS 20 can multicast (i.e., transmit to simultaneously) such images to multiple remote devices on the network. In general, such images are written to the remote device from the hard disk buffer 48. In addition, in at least one embodiment, live video may be transmitted in real-time (i.e., as it is acquired by the camera 3) to one or more such remote devices on the network, or from the CD-R.

The GUI 62 allows the recorded images to be transmitted to such a remote device using a single touch of the touch-screen display 21 by the user. The user does not need to know or type any user identifier or password. This capability is set up during the configuration process 705. More specifically, the configuration process 705 provides a mode in which a network set up menu screen is displayed, such as shown in FIG. 11. This menu screen enables the user to enter an Internet Protocol (IP) address of a remote network server or other remote device. The user can enter such address using soft button controls, as shown. Accordingly, when the user wishes to transmit and/or save captured images to the remote device during normal operation, the user can do so using a single touch of a soft button control.

Figure 12:
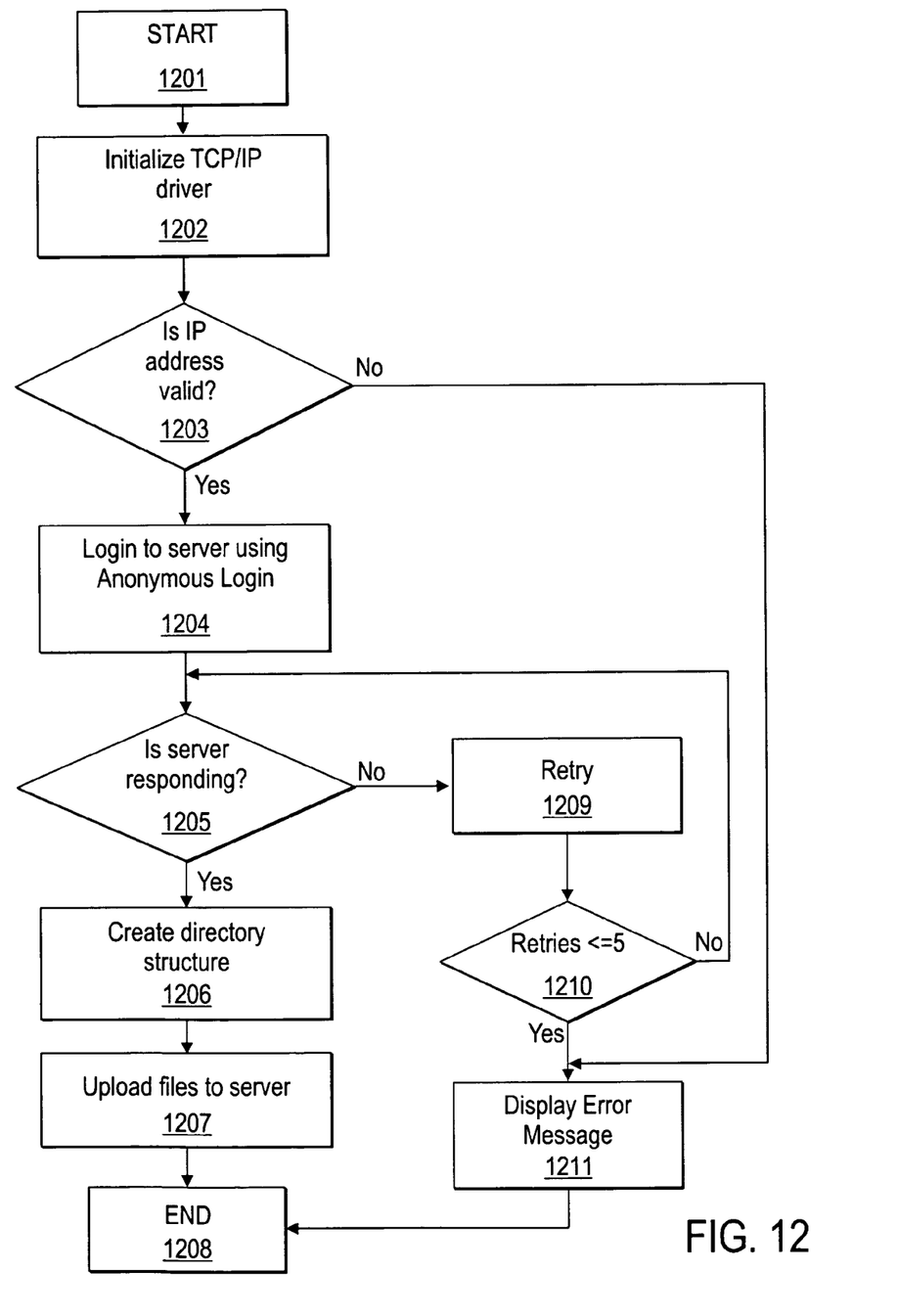
FIG. 12 is a flow diagram illustrating a procedure for performing "one-touch" network log on and writing of images to a remote processing system.

FIG. 12 shows a process for performing the above-described "one touch" network log on and saving of video or captured images onto a remote server. In response to the single user input at 1201 (e.g., pressing a "Write to Network" soft button), the DCS 20 initializes TCP/IP (Transport Control Protocol/IP) at 1202. At 1203, it is determined whether the previously entered IP address is valid. If not, an error message is displayed at 1211, and the process then terminates at 1208. If the address is valid, then at 1204, the DCS 20 logs in to the remote server according to the IP address, using anonymous FTP login. It is then determined at 1205 whether the server is responding. If the server is responding, then at 1206, a directory structure is created, the appropriate file or files are uploaded to the server via the network at 1207, and the process terminates at 1208. If the server is not responding at 1205, then at 1209, another attempt is made to login to the server. Up to five (or any other predetermined number of) attempts may be made to contact the server, per 1210. If all such attempts are unsuccessful, an error message is displayed at 1211, and the process terminates at 1208.

As indicated above, many if not all of the above-mentioned functions may alternatively be initiated by voice commands through the VCS 10 or by the remote control.

Thus, a multi-function digital image capture device for use with an endoscopic camera system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. An image capture unit comprising:
   a capture circuit to receive and capture video generated by an endoscopic camera and to capture still images from the video;
   a storage device to store the captured video and still images;
   a network interface to connect the image capture unit to a network; and
   a processing unit to
      cause the captured video or the still images to be transmitted to and stored on a remote processing system over the network without requiring a user input at the remote processing system,
      cause the captured video, as it is acquired by the endoscopic camera in real-time, to be transmitted substantially simultaneously to a plurality of remote processing systems over the network, and
      cause groups of N still images to be printed automatically in response to the capture of every N still images, where N is a predetermined number and wherein automatically printing does not require the user to enter a print command.

2. The image capture unit as recited in claim 1, wherein the image capture unit is an integrated device in which the capture circuit, the storage device, the network interface and the processing unit are all incorporated within a single housing.

3. The image capture unit as recited in claim 1, wherein the processing unit is operable to cause the captured video or the still images to be transmitted to and stored on the remote processing system in response to a single user input at the image capture unit.

4. The image capture unit as recited in claim 1, wherein the processing unit is operable to cause the captured video or the still images to be transmitted to and stored on the remote processing system by:
   initializing a network protocol;
   logging in to the remote processing system by using a network address previously stored in the image capture unit; and
   storing the video or the still images on the remote processing system via the network.

5. The image capture unit as recited in claim 4, wherein logging in comprises using anonymous FTP login.

6. The image capture unit as recited in claim 4, wherein the processing unit further is operable to cause the still images to be multicast to a plurality of remote processing systems over the network.

7. The image capture unit as recited in claim 1, further comprising a display device.

8. The image capture unit as recited in claim 7, wherein the processing unit further is operable to cause a graphical user interface to be displayed on the display device to allow a user to control the image capture unit.

9. The image capture unit as recited in claim 8, wherein the display device further is operable to display the captured video or still images.

10. The image capture unit as recited in claim 1, further comprising a video output through which to send the captured video or still images to an external monitor.

11. An image capture unit comprising:
   a capture circuit to receive and capture video generated by an endoscopic camera and to capture still images from the video;
   a storage device to store the captured video and still images;
   a network interface to connect the image capture unit to a network; and
   a processing unit to
      cause the captured video, as it is acquired by the endoscopic camera in real-time, to be transmitted substantially simultaneously to a plurality of remote processing systems over the network, and
      cause groups of N still images to be printed automatically in response to the capture of every N still images, where N is a predetermined number and wherein automatically printing does not require the user to enter a print command.

12. The image capture unit as recited in claim 11, wherein the image capture unit is an integrated device such that the capture circuit, the storage device, the network interface and the processing unit are all incorporated within a single housing.

13. The image capture unit as recited in claim 11, further comprising:
   a printer interface through which to communicate with the printer.

14. An image capture unit comprising:
   a capture circuit to receive and capture video generated by an endoscopic camera and to capture still images from the video;
   a storage device to store the captured video and still images;
   a printer interface through which to communicate with a printer; and
   a processing unit to cause groups of N still images to be printed automatically in response to the capture of every N still images, where N is a predetermined number and wherein automatically printing does not require the user to enter a print command.

* * * * *